(12) United States Patent
Schnell et al.

(10) Patent No.: US 9,103,236 B2
(45) Date of Patent: Aug. 11, 2015

(54) CAM FOLLOWER

(71) Applicant: Schaeffler Technologies GmbH & Co. KG, Herzogenaurach (DE)

(72) Inventors: Oliver Schnell, Veitsbronn (DE); Peter Sailer, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/193,328

(22) Filed: Feb. 28, 2014

(65) Prior Publication Data

US 2014/0245981 A1 Sep. 4, 2014

(30) Foreign Application Priority Data

Mar. 1, 2013 (DE) .......................... 10 2013 203 520

(51) Int. Cl.
*F01L 1/14* (2006.01)
*F01M 9/10* (2006.01)
*F16C 33/10* (2006.01)

(52) U.S. Cl.
CPC *F01L 1/14* (2013.01); *F01M 9/104* (2013.01); *F01M 9/106* (2013.01); *F01L 2105/02* (2013.01); *F01L 2810/02* (2013.01); *F16C 33/10* (2013.01)

(58) Field of Classification Search
CPC ..... F01L 1/14; F01L 2105/02; F01L 2810/02; F01M 9/104; F01M 9/106
USPC .................................. 123/90.48, 90.37, 90.44
See application file for complete search history.

(56) References Cited

FOREIGN PATENT DOCUMENTS

| DE | 102005059027 |   | 6/2007 |
|----|--------------|---|--------|
| DE | 102008036056 |   | 2/2010 |
| JP | 2004197914 A | * | 7/2004 |
| WO | 2004038184   |   | 5/2004 |

* cited by examiner

*Primary Examiner* — Ching Chang
(74) *Attorney, Agent, or Firm* — Volpe and Koenig, P.C.

(57) ABSTRACT

A cam follower for actuating at least one gas exchange valve of an internal combustion engine is provided, including a cam contact roller that is supported by a plain bearing on a pin (13). A first sliding surface of the plain bearing faces the cam contact roller and a second sliding surface of the plain bearing faces the pin. The plain bearing has a lubricant reservoir, in order to provide at least one of the sliding surfaces of the plain bearing with lubricant, and the lubricant reservoir is arranged at a distance from the end sides of the plain bearing.

4 Claims, 1 Drawing Sheet

CAM FOLLOWER

INCORPORATION BY REFERENCE

The following documents are incorporated herein by reference as if fully set forth: German Patent Application No. 102013203520.9, filed Mar. 1, 2013.

FIELD OF THE INVENTION

The invention relates to a cam follower for actuating a gas exchange valve of an internal combustion engine.

BACKGROUND

Cam followers are arranged in internal combustion engines within a valve train as transmission elements between cams and the gas exchange valves to be actuated. Cam followers include a lever body that is supported on one end on a support element and with its other end acts on the gas exchange valve to be opened via a contact surface. In a section of the lever body that is close to the center, there is a cam following surface on which, during the operation of an internal combustion engine, a cam of a camshaft runs and causes an oscillating motion of the finger follower. The cam following surface can be constructed as the sliding surface or as a cam roller.

Cam followers are to be understood as, for example, finger followers, rocker arms, or oscillating arms.

From DE 10 2008 036 056, a cam follower is known that is constructed as a finger follower. The cam roller is arranged in a section of the finger follower close to the center between the side walls. The cam roller is supported by a bearing pin. The cam roller is supported by a plain bearing and needles guided in a cage on the bearing pin.

DE 10 2005 059 027 A1 discloses a finger follower that provides a lubricant pocket in at least one side wall. The lubricant pocket is used for supplying the cam roller with lubricant. The lubricant pocket has a wedge-shaped construction.

In EP 1 554 469 B1, a cam follower of an internal combustion engine is disclosed. In the cam follower, a contact surface for a cam has a microstructure. The microstructure has a grating-like construction.

SUMMARY

The objective of the present invention is to provide a cam follower that has an increased service life.

According to the invention, this objective is met by a cam follower for actuating at least one gas exchange valve of an internal combustion engine, with a cam contact roller, wherein the cam contact roller is supported by a plain bearing on a pin, wherein a first sliding surface of the plain bearing faces the cam contact roller and a second sliding surface of the plain bearing faces the pin, wherein the plain bearing has a lubricant reservoir in order to provide at least one of the sliding surfaces of the plain bearing with lubricant and wherein the lubricant reservoir is arranged at a distance from end sides of the plain bearing.

Cam followers are to be understood as, for example, finger followers, rocker arms, tappets, or oscillating arms. However, the invention is not limited to these types of cam followers. For lever-like cam followers with cam rollers that are supported by a plain bearing on a bearing pin, adhesive wear or scoring can occur on the sliding surfaces. The sliding surfaces of the plain bearing are, first, the surface that is in contact with the cam roller and, second, the surface that is in contact with the bearing pin.

In the cam follower according to the invention, a lubricant reservoir is provided in the plain bearing. This lubricant reservoir is used to provide at least one sliding surface with lubricant. The lubricant reservoir can be provided such that it can provide one of the sliding surfaces or both sliding surfaces with lubricant. In addition, the lubricant reservoir is provided in the plain bearing such that this is arranged at a distance from the end sides of the plain bearing. In this way it can be prevented that the lubricant can be discharged from the lubricant reservoir when the cam follower is at rest. When the cam follower is in operation, the lubricant can be fed by the rotation of the plain bearing into the lubricant reservoir.

The lubricant reservoir provides for a continuous supply of the sliding surface/s with lubricant. Through continuous lubrication, the wear on the plain bearing and cam roller/bearing pin can be reduced, which increases the service life of the lever-like cam follower. Greases or oils can be used as the lubricant. Furthermore, solid lubricants, such as graphite, are also conceivable.

Alternatively, it is also conceivable that, in addition to the plain bearing, a cage containing needles could be provided that supports the cam roller on the bearing pin. This means that one of the sliding surfaces is in contact with the needles. In this case, a lubricant reservoir could also be provided.

According to one construction of the invention, the end sides and the lubricant reservoir are spaced apart from each other such that this forms a seal. The seal is used such that, in the rest state, lubricant cannot escape from the lubricant reservoir. The magnitude of the distance between the lubricant reservoir and the respective end side is dependent on the magnitude of the plain bearing and the lubricant reservoir.

In one preferred construction of the invention, the lubricant reservoir is formed by at least one channel in the plain bearing. The at least one channel is used such that the lubricant can be stored in this channel. Alternatively, several channels could also be provided.

Advantageously, the at least one channel has a spiral-shaped construction. Furthermore, it is also possible to construct the channel, for example, with a helical, peripheral, or spiral-shaped form in at least one of the sliding surfaces. Furthermore, the channel can be constructed by a recess, for example, as notch/es, flute/s, bead's, pocket/s, chamfer/s, indentation/s, or groove/s in the sliding surface. Alternatively, the recess could also be provided with a radial or axial profile. Furthermore, a change in the through-flow cross section of the recess could also be possible. Likewise, a combination of the different recesses is also conceivable. The recess allows a transport of the lubricant along all of the sliding surface/s.

According to one construction of the invention, the plain bearing is constructed as a slide ring.

The plain bearing or slide ring could be made from a metallic material. As the metallic materials, copper, brass, soft metals, or similar materials could be used. Alternatively, the plain bearing is made from a plastic. As the plastic, for example, PTFE could be used. However, also other plastics are conceivable. Likewise, plain bearings made from ceramic or a ceramic-like material could be used.

BRIEF DESCRIPTION OF THE DRAWINGS

An embodiment of the invention will be described below with reference to three figures. Shown are.

DETAILED DESCRIPTION OF THE PREFERRED EMBODIMENTS

Figure 1:
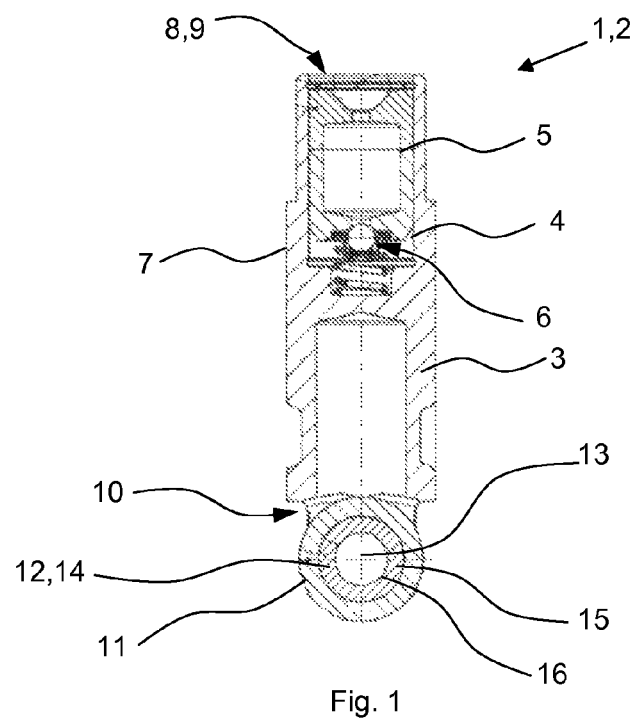
FIG. 1 is a longitudinal section through a cam follower according to the invention.

FIG. 1 shows a cam follower 1 according to the invention that is constructed in this embodiment as a roller tappet 2. However, the invention is not limited to this construction.

The roller tappet 2 is formed of a hollow cylindrical housing 3, wherein an inner element 5 is installed so that it can move in the longitudinal direction in the recess 4 of this housing. The inner element has a hydraulic clearance compensation element 6. The housing 3 is supported by an outer lateral surface 7 so that it can move in the longitudinal direction in a drilled hole of the internal combustion engine or a component connected to the internal combustion engine.

A first end side 8 of the housing 3 has a contact 9 for a not-shown end of a tappet rod. A second end side 10 of the housing 3 is provided with a cam contact roller 11. This is used as a direct contact surface for a not-shown cam of a camshaft.

The cam contact roller 11 is supported by a plain bearing 12 on a pin 13. The plain bearing 12 is constructed as a slide ring 14. The slide ring 14 has a first sliding surface 15 and a second sliding surface 16. The first sliding surface 15 is the surface of the slide ring 14 that faces the cam contact roller 11. The second sliding surface 16 is the surface of the slide ring 14 that faces the pin 13. The slide ring 14 has a lubricant reservoir 17 that is not visible in FIG. 1.

Figure 2:
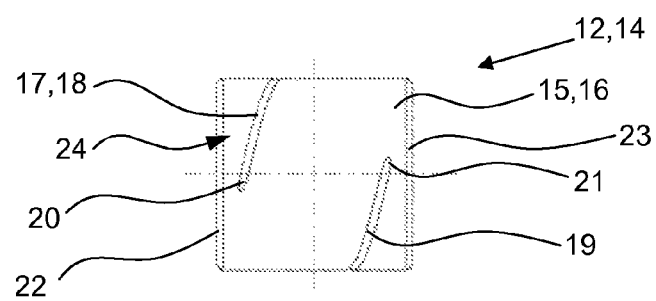
FIG. 2 is a detail view a sliding surface with a lubricant reservoir of the cam follower according to the invention.
Figure 3:
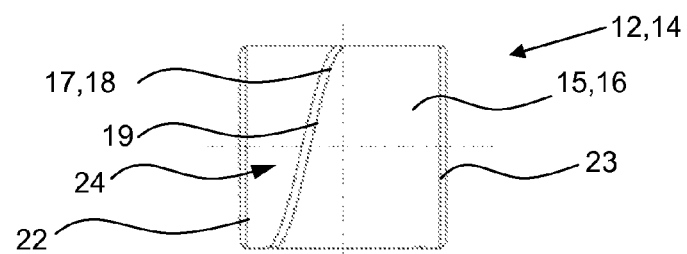
FIG. 3 is a detail view of a sliding surface with a lubricant reservoir of the lever-like cam follower according to the invention.

FIGS. 2 and 3 each show a detail view of the sliding surfaces 15, 16 of the slide ring 14 towards which the lubricant reservoir 17 points. The lubricant reservoir is basically formed by a channel 18. The lubricant reservoir 17 can be provided on one of the sliding surfaces 15, 16 or on both sliding surfaces 15, 16. The channel 18 is used for supplying the sliding surfaces 15, 16 with lubricant. For simplifying the description, identical parts are designated with identical reference symbols.

FIG. 2 shows a first area of the lubricant reservoir 17. The channel 18 of the lubricant reservoir 17 is formed by a peripheral, spiral-shaped groove 19. The two ends 20, 21 of the groove do not connect to each other. As can be further seen from FIG. 2, the channel 18 is arranged at a distance from end sides 22, 23. Through the spaced arrangement of the channel 18, a seal 24 is formed. The seal 24 prevents lubricant from being discharged from the lubricant reservoir 17 when the cam follower is at rest.

FIG. 3 shows a second area of the lubricant reservoir 17. The channel 18 has an inclined groove 19. It can be seen from FIG. 3 that the channel 18 is arranged at a distance from the end sides 22, 23.

LIST OF REFERENCE SYMBOLS

1 Cam follower
2 Roller tappet
3 Housing
4 Recess
5 Inner element
6 Clearance compensation element
7 Outer lateral surface
8 First end side
9 Contact
10 Second end side
11 Cam contact roller
12 Plain bearing
13 Pin
14 Slide ring
15 First sliding surface
16 Second sliding surface
17 Lubricant reservoir
18 Channel
19 Groove
20 End
21 End
22 End side
23 End side
24 Seal

The invention claimed is:

1. A cam follower for actuating at least one gas exchange valve of an internal combustion engine, comprising a cam contact roller that is supported by a plain bearing on a pin, the plain bearing includes a first sliding surface that faces the cam contact roller, a second sliding surface that faces the pin, and two end sides, and the plain bearing includes a lubricant reservoir formed by at least one surface channel extending partially into at least one of the sliding surfaces of the plain bearing in order to provide the at least one of the sliding surfaces of the plain bearing with lubricant, and the lubricant reservoir is arranged at a distance from the end sides.

2. The cam follower according to claim 1, wherein the end sides and the lubricant reservoir are spaced apart from each other such that the cam follower forms a seal.

3. The cam follower according to claim 1, wherein the at least one surface channel has a spiral-shaped construction.

4. The cam follower according to claim 1, wherein the plain bearing is constructed as a slide ring.

* * * * *